(12) United States Patent
Sarma et al.

(10) Patent No.: US 12,389,435 B2
(45) Date of Patent: Aug. 12, 2025

(54) ENHANCED PREDICTION OF TIMING OF ACTIVITY FOR WIRELESS DEVICES

(71) Applicant: Cypress Semiconductor Corporation, San Jose, CA (US)

(72) Inventors: Munukutla Sandeep Sarma, Bangalore (IN); Raghavendra Kencharla, Bangalore (IN); Manamohan D. Mysore, Ramona, CA (US); James Wihardja, Tustin, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 423 days.

(21) Appl. No.: 17/555,171

(22) Filed: Dec. 17, 2021

(65) Prior Publication Data

US 2023/0199814 A1   Jun. 22, 2023

(51) Int. Cl.
*H04W 72/00* (2023.01)
*H04W 72/121* (2023.01)
*H04W 72/50* (2023.01)
*H04W 4/80* (2018.01)

(52) U.S. Cl.
CPC ....... *H04W 72/535* (2023.01); *H04W 72/121* (2013.01); *H04W 4/80* (2018.02)

(58) Field of Classification Search
CPC ... H04W 72/535; H04W 72/121; H04W 4/80; H04W 72/1215
See application file for complete search history.

(56) References Cited

U.S. PATENT DOCUMENTS

| | | | |
|---|---|---|---|
| 2014/0233444 A1* | 8/2014 | Wang | H04W 52/028 370/311 |
| 2016/0219522 A1* | 7/2016 | Asterjadhi | H04W 52/0235 |
| 2019/0174418 A1* | 6/2019 | Kencharla | H04W 52/0216 |
| 2020/0145795 A1* | 5/2020 | Kashef | H04L 67/12 |
| 2022/0386315 A1* | 12/2022 | Yang | H04L 1/0026 |

* cited by examiner

*Primary Examiner* — Lakeram Jangbahadur (57) ABSTRACT

Systems, methods, and devices predict activity of wireless devices. Methods include identifying one or more conditions indicating aperiodic activity will occur at a first radio, the first radio being a wireless radio compatible with a first wireless communications protocol, and receiving, at a second radio, timing information associated with the first radio via an interface between the first radio and the second radio, the second radio being a wireless radio compatible with a second wireless communications protocol, the first radio and the second radio being collocated in a wireless device. Methods also include scheduling wireless activity of the second radio based, at least in part, on the timing information.

20 Claims, 11 Drawing Sheets

ENHANCED PREDICTION OF TIMING OF ACTIVITY FOR WIRELESS DEVICES

TECHNICAL FIELD

This disclosure generally relates to wireless devices, and more specifically, to predicting timing of activity associated with such wireless devices.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. Conventional techniques for handling activity of collocated wireless radios remain limited because they are not able to efficiently handle resource conflicts and are not able to avoid contention that may occur due to aperiodic activity.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

As will be discussed in greater detail below, wireless devices may communicate with each other via one or more communications modalities. Moreover, wireless devices may include one or more collocated wireless radios configured to communicate via different wireless communications modalities. Collocated wireless radios may share access to one or more aspects of a transmission medium. Accordingly, activity of collocated radios is scheduled to avoid conflicts that may arise due to overlapping use of such a transmission medium. Conventional techniques for scheduling activity remain limited because activity from radios may be randomized and unpredictable. Accordingly, conventional techniques might not be able to efficiently allow one radio to avoid conflicts with another because such conventional techniques are not able to predict such random activity.

Embodiments disclosed herein provide the ability to precisely predict wireless activity to enable efficient scheduling of wireless activity of collocated radios while reducing resource conflicts. As will be discussed in greater detail below, collocated radios may communicate with each other via an interface. Accordingly, timing information about subsequent transmission events may be transmitted from a first radio to a second radio, thus enabling the second radio to schedule its own activity to avoid conflicts with the subsequent transmission events. Therefore, when such subsequent transmission events are at least partially random, as may occur with quasi-deterministic advertisement intervals, pre-computed timing information may be transmitted in advance to enable such efficient and precise scheduling. Additional details regarding such embodiments are discussed in greater detail below.

Figure 1:
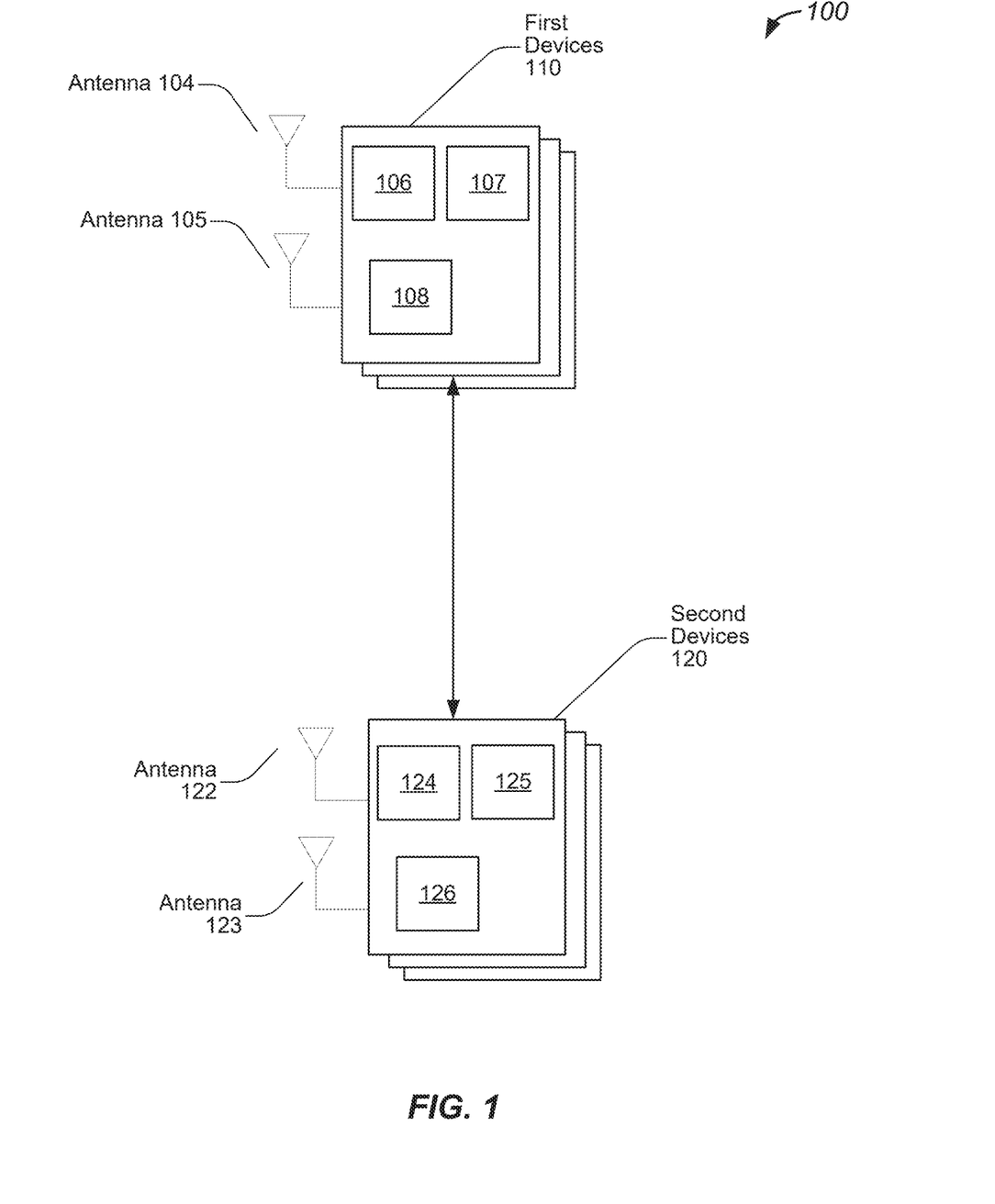
FIG. 1 illustrates an example of a system for wireless activity prediction, configured in accordance with some embodiments.

FIG. 1 illustrates an example of a system for wireless activity prediction, configured in accordance with some embodiments. As discussed above, various wireless devices may communicate with each other via one or more wireless communications media. For example, wireless devices may communicate with each other via a Wi-Fi connection or a Bluetooth connection. In various embodiments, the wireless devices may include collocated radios configured in accordance with such wireless protocols. As will be discussed in greater detail below, wireless devices disclosed herein and systems, such as system 100, that implement such wireless devices are configured to improve the prediction and estimation of timing of network activity. Accordingly, embodiments disclosed herein enable improved prediction of aperiodic and/or quasi-deterministic network activity thus reducing resource conflicts between collocated radios and enhancing the efficiency and efficacy of medium sharing.

In various embodiments, system 100 may include first devices 110 which may be wireless devices. As discussed above, such wireless devices may be compatible with one or more wireless transmission protocols, such as a Wi-Fi protocol or a Bluetooth protocol. In some embodiments, first devices 110 are combination devices that include both Wi-Fi and Bluetooth radios. Accordingly, first devices 110 may include a Wi-Fi radio and a Bluetooth radio, as well as their associated processing logic. In some embodiments, radios included in first devices 110 may be compatible with a Bluetooth Low Energy specification and protocol, also referred to as Bluetooth Smart. In various embodiments, first devices 110 may be smart devices, such as those found in wearable devices, or may be monitoring devices, such as those found in smart buildings, environmental monitoring, and energy management. It will be appreciated that such wireless devices disclosed herein may be any suitable device, such as those found in cars, other vehicles, and even medical implants.

As shown in FIG. 1, various wireless devices may be in communication with each other via one or more wireless communications mediums. As shown in FIG. 1, first devices 110 may each include antennas, such as antenna 104 and antenna 105. First devices 110 may also include processing device 108 as well as radio 106 and radio 107. As used herein, a radio may refer to a transceiver as well as associated supporting processing hardware, as will be discussed in greater detail below with reference to FIG. 3. For example, a radio may include a transceiver as well as processing elements configured to implement a physical layer for the radio. Moreover, such processing devices and radios may be configured to improve prediction of wireless activity to reduce resource conflicts and network contention between radio 106 and radio 107. More specifically, components of first devices 110 may be configured to transmit information, such as delay information, between radios 106 and 107 to improve the accuracy with which activity of radios 106 and 107 may be scheduled.

In some embodiments, system 100 may further include second devices 120 which may also be wireless devices. As similarly discussed above, second devices 120 may be compatible with one or more wireless transmission protocols, such as a Wi-Fi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include antennas, such as antenna 122 and 123, as well as processing device 126, radio 124 and radio 125. As discussed above, second devices 120 may also be configured to improve prediction of wireless activity to reduce resource conflicts and network contention between radio 124 and radio 125. Additional details regarding such wireless activity prediction will be discussed in greater detail below.

Figure 2:
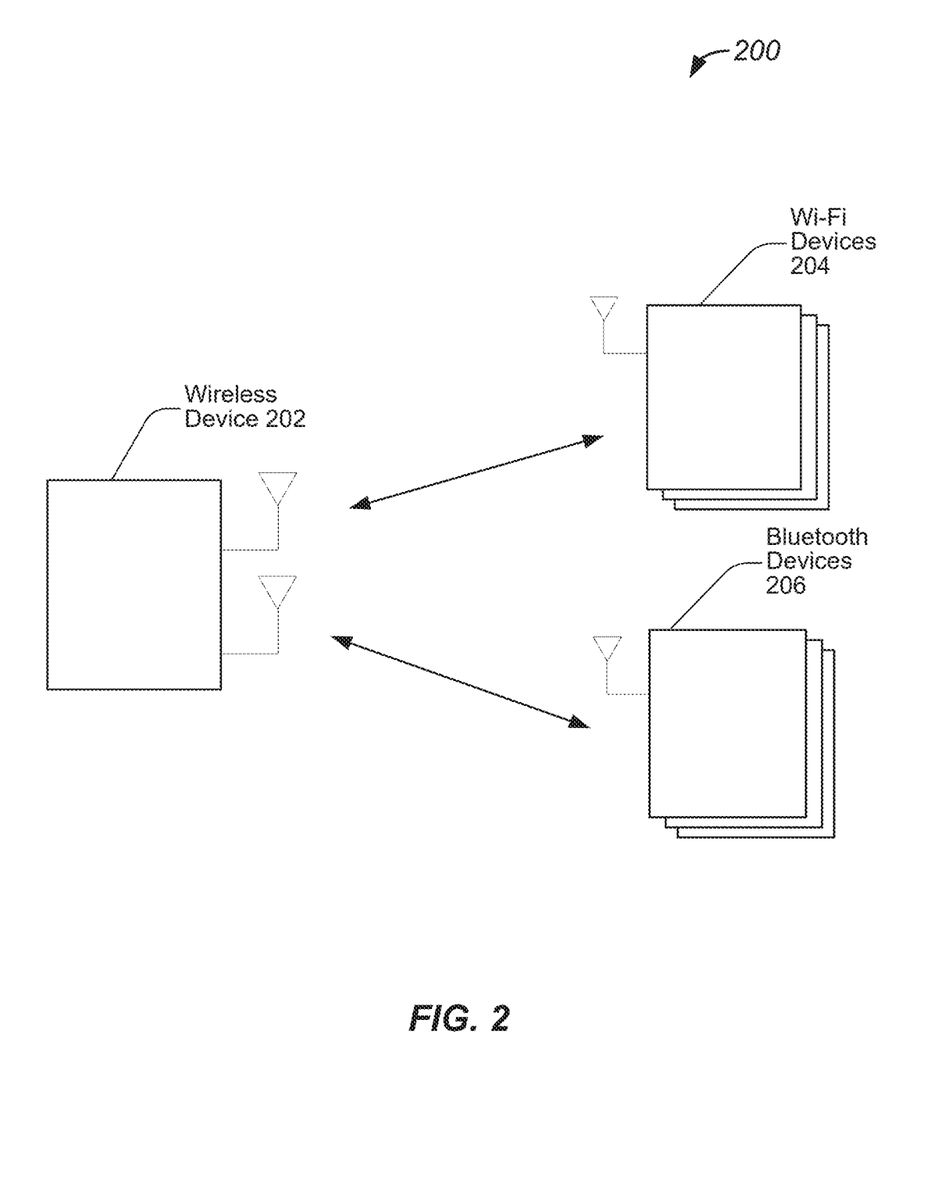
FIG. 2 illustrates an example of another system for wireless activity prediction, configured in accordance with some embodiments.

FIG. 2 illustrates an example of another system for wireless activity prediction, configured in accordance with some embodiments. In various embodiments, system 200 may include Wi-Fi devices 204 and Bluetooth devices 206. Accordingly, each of Wi-Fi devices 204 and Bluetooth devices 206 may be single-radio devices specifically configured to implement their respective communications protocols. In some embodiments, system 200 further includes wireless device 202 which may be configured to communicate with Wi-Fi devices 204 and Bluetooth devices 206.

As similarly discussed above, wireless device 202 is configured to improve the prediction and estimation of timing of network activity. More specifically, wireless device 202 may include a Wi-Fi radio to communicate with Wi-Fi devices 204 and a Bluetooth radio to communicate with Bluetooth devices 206. As will be discussed in greater detail below, wireless device 202 may include an interface that is configured to facilitate the transmission of information between such collocated radios included in wireless device 202 to improve the prediction of timing of wireless activity, and improve the anticipation and mitigation of conflicts between activity of the Wi-Fi radio and Bluetooth radio collocated in wireless device 202.

Figure 3:
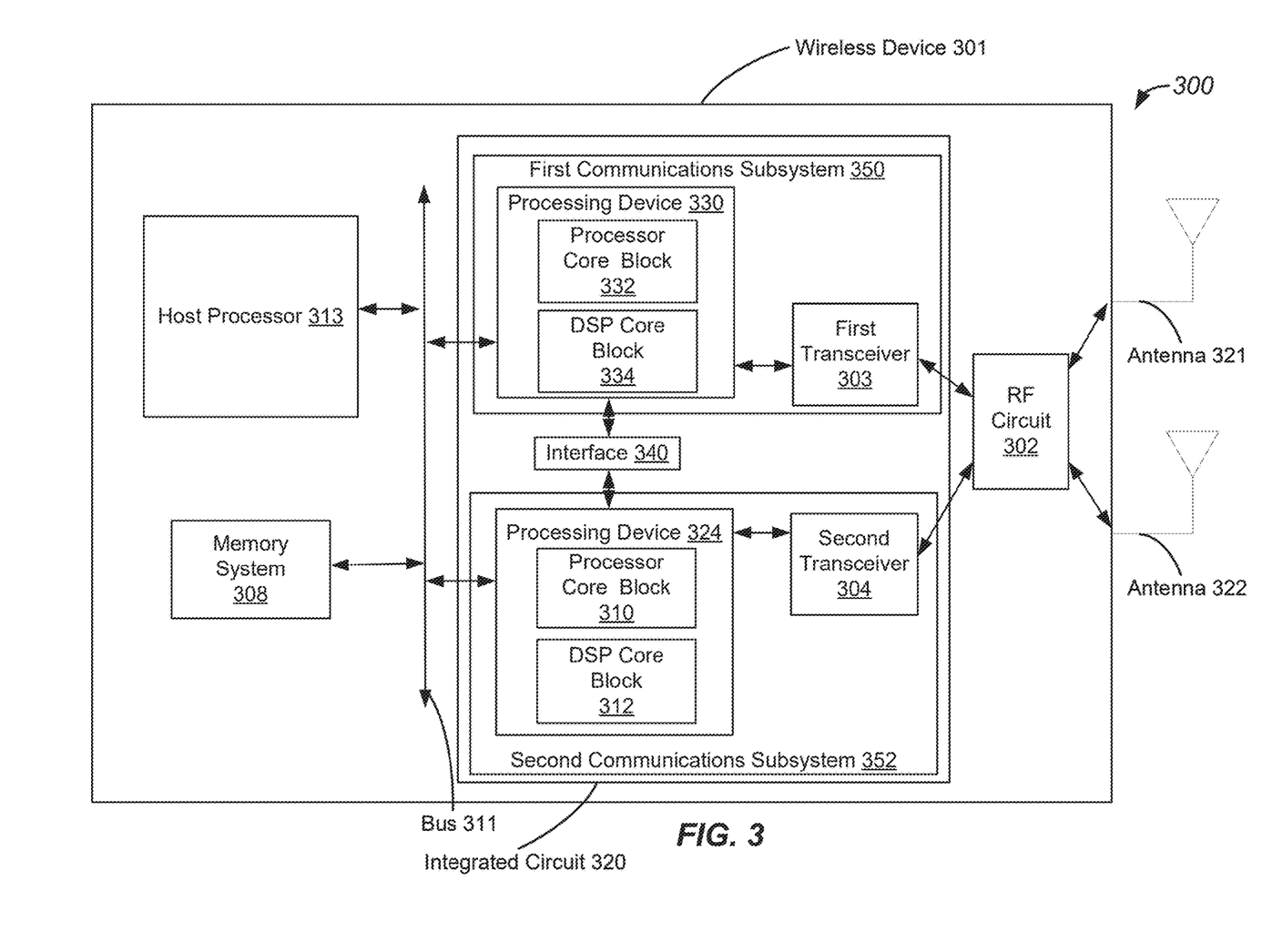
FIG. 3 illustrates an example of yet another system for wireless activity prediction, configured in accordance with some embodiments.

FIG. 3 illustrates an example of yet another system for wireless activity prediction, configured in accordance with some embodiments. More specifically, FIG. 3 illustrates an example of a system, such as system 300, that may include wireless device 301. It will be appreciated that wireless device 301 may be one of any of the wireless devices discussed above with reference to FIGS. 1 and 2, such as first devices 110, second devices 120, wireless device 202, Wi-Fi devices 204, or Bluetooth devices 206.

In various embodiments, wireless device 301 includes collocated transceivers, such as first transceiver 303 and second transceiver 304, which may be included in radios such as radios 106, 107, 124, and 125 discussed above. In one example, system 300 includes first transceiver 303 which is configured to transmit and receive signals using a communications medium that may include antenna 321 or antenna 322. As noted above, first transceiver 303 may be a Bluetooth transceiver. For example, first transceiver 303 may be compatible with a Bluetooth Low Energy communications protocol. In some embodiments, system 300 also includes second transceiver 304 that may be a Wi-Fi transceiver. Accordingly, second transceiver 304 may be compatible with a Wi-Fi communications protocol, such as an 802.11ax protocol. In various embodiments, transceivers 303 and 304 each include a modulator and demodulator as well as one or more buffers and filters, that are configured to generate and receive signals via antenna 321 and/or antenna 322.

In various embodiments, system 300 further includes one or more communications subsystems, such as first communications subsystem 350. As will be discussed in greater detail below, communications subsystems may include processing devices and transceivers that are used to implement radios as disclosed herein. In various embodiments, processing devices, such as processing device 324 which may include logic implemented using one or more processor cores. Accordingly, processing device 324 is configured to implement logic for wireless activity prediction and scheduling, as will be discussed in greater detail below. In various embodiments, processing device 324 includes processing elements configured to perform timing value computation and transmission operations, as well as scheduling operations, that will be described in greater detail below. Processing device 324 includes one or more components configured to implement a medium access control (MAC) layer that is configured to control hardware associated with a wireless transmission medium, such as that associated with a Wi-Fi transmission medium. In one example, processing device 324 may include processor core block 310 that may be configured to implement a driver, such as a Wi-Fi driver. Accordingly, as will be discussed in greater detail below with reference to FIG. 4, processing device 324 may include components associated with second transceiver 304, such as MAC layers and packet traffic arbiters. Processing device 324 may further include digital signal processor (DSP) core block 312 which may be configured to include microcode.

System 300 may also include second communications subsystem 352 which may include processing device 330, which may also be configured to implement logic for wireless activity prediction and scheduling. Accordingly, processing device 330 may include processing elements configured to perform timing value computation and transmission operations. In various embodiments, processing device 330 includes processor core block 332 and DSP core block 334. Furthermore, processor core block 332 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high-level data layers. Moreover, a controller stack includes a link management protocol, a host controller interface, a link layer which may be a low energy link layer, as well as various other timing critical layers. In various embodiments, processor core block 332 may be configured to implement schedulers, as will be discussed in greater detail below. Processing device 330 may further include digital signal processor (DSP) core block 334 which may be configured to include microcode.

In various embodiments, system 300 additionally includes interface 340 which is configured to provide communication between processing device 324 and processing device 330. Accordingly, components of the processing devices, such as packet traffic arbiters and schedulers, may communicate with each other via interface 340. As will be discussed in greater detail below, interface 340 may be a coexistence interface, such as a serial enhanced coexistence interface (SECI). It will be appreciated that interface 340 may be other types of interfaces as well, such as a 3-wire interface or a 4-wire interface. Accordingly, interface 340 enables the passage of coexistence data and timing information between collocated devices.

System 300 further includes radio frequency (RF) circuit 302 which is coupled to antenna 321 and antenna 322. In various embodiments, RF circuit 302 may include various components such as an RF switch, a diplexer, and a filter. Accordingly, RF circuit 302 may be configured to select an antenna for transmission/reception, and may be configured to provide coupling between the selected antenna, such as antenna 321 or antenna 322, and other components of system 300 via a bus, such as bus 311. While one RF circuit is shown, it will be appreciated that wireless device 301 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 3 illustrates system 300 as having a multiple antennas, it will be appreciated that system 300 may be implemented with a single antenna.

System 300 includes memory system 308 which is configured to store one or more data values associated with wireless activity prediction operations discussed in greater detail below. Accordingly, memory system 308 includes storage device, which may be a non-volatile random-access memory (NVRAM) configured to store such data values, and may also include a cache that is configured to provide a local cache. In various embodiments, system 300 further includes host processor 313 which is configured to implement processing operations implemented by system 300.

It will be appreciated that one or more of the above-described components may be implemented on a single chip, or on different chips. For example, first transceiver 303, second transceiver 304, processing device 324, and processing device 330 may be implemented on the same integrated circuit chip, such as integrated circuit chip 320. In another example, first transceiver 303, second transceiver 304, processing device 324, and processing device 330 may each be implemented on their own chip, and thus may be disposed separately as a multi-chip module or on a common substrate such as a printed circuit board (PCB). It will also be appreciated that components of system 300 may be implemented in the context of a low energy device, a smart device, or a vehicle such as an automobile. Accordingly, some components, such as integrated chip 320, may be implemented in a first location, while other components, such as antenna 321 and/or antenna 322, may be implemented in second location, and coupling between the two may be implemented via a coupler.

Figure 4:
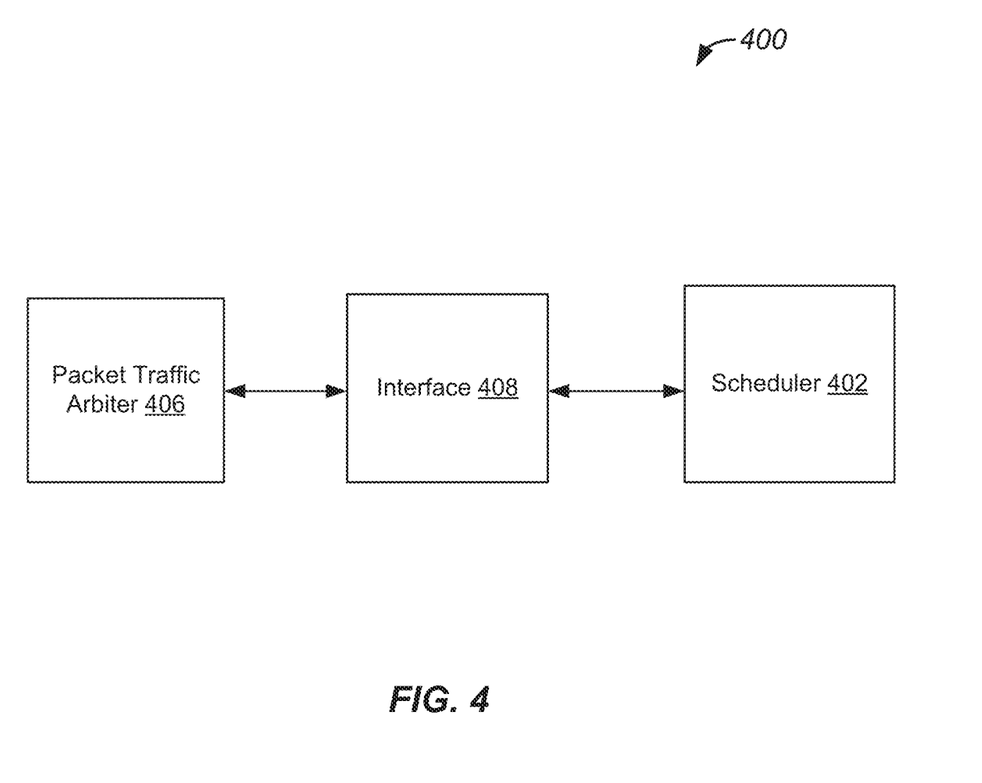
FIG. 4 illustrates an example of a device for wireless activity prediction, configured in accordance with some embodiments.

FIG. 4 illustrates an example of a device for wireless activity prediction, configured in accordance with some embodiments. As similarly discussed above, communication may be provided between components of Wi-Fi radios and Bluetooth radios to improve anticipation and mitigation of resource conflicts for such radios when collocated. As will be discussed in greater detail below, one or more components of a Bluetooth radio may be provided communication with one or more components of a Wi-Fi radio to enable the transmission of timing and delay information of activity of the Bluetooth radio, and enable the Wi-Fi radio to schedule traffic based on such transmitted information.

Device 400 includes scheduler 402 which is configured to schedule wireless activity of a first radio, which may be a Bluetooth radio. Accordingly, scheduler 402 may comprise processing elements that are configured to schedule the timing of transmission of data by Bluetooth radio. Such data may be included in data packets and data frames, and may be timed in accordance with one or more aspects of a wireless communications protocol. For example, scheduler 402 may be configured to schedule traffic based on a designated interval as well as a random delay, as may be determined by, for example, a Bluetooth protocol. Additional details regarding such scheduling will be discussed in greater detail below with reference to at least FIGS. 10 and 11.

In various embodiments, scheduler 402 is implemented in a communications subsystem. For example, as discussed above with reference to FIG. 3, a communications subsystem may include processing elements configured implement scheduler 402. Such processing elements may be implemented in a dedicated processing block, or may be implemented as part of another block, such as a processor core block. In some embodiments, scheduler 402 may be implemented in a separate logic device, such as logic included in a memory system, as also discussed above with reference to FIG. 3.

Device 400 additionally includes packet traffic arbiter 406 which is configured to manage packet traffic and operation associated with a second radio, which may be a Wi-Fi radio. Accordingly, packet traffic arbiter 406 may comprise processing elements that are configured to cancel and terminate activity of the Wi-Fi radio in response to determining that another radio, such as the Bluetooth radio, as requested access of one or more resources, such as a transmission medium. As will be discussed in greater detail below, such access requests may be transmitted via one or more RF active requests sent by, for example, the Bluetooth radio. As will also be discussed in greater detail below, such requests may also include timing values and delay values that may be used by packet traffic arbiter 406 to anticipate future activity of the Bluetooth radio, and to schedule activity of the Wi-Fi radio around such anticipated activity.

In various embodiments, packet traffic arbiter 406 is implemented in a communications subsystem. For example, as discussed above with reference to FIG. 3, a communications subsystem may include processing elements configured implement packet traffic arbiter 406. Such processing elements may be implemented in a dedicated processing block, or may be implemented as part of another block, such as a processor core block. In some embodiments, packet traffic arbiter 406 may be implemented in a separate logic device, such as logic included in a memory system, as also discussed above with reference to FIG. 3, or a separate coexistence device.

Device 400 also includes interface 408 which is configured to enable scheduler 402 to transmit information to packet traffic arbiter 406. In various embodiments, interface 408 may be a SECI that is configured to enable transmission of data between the Wi-Fi and Bluetooth radios. Accordingly, interface 408 may be implemented using one or more processor cores of processing device 324 discussed above. As will be discussed in greater detail below, such data may be information that includes timing and delay information. More specifically, the timing information may identify a duration of an advertisement interval, and the delay information may include a predetermined random delay. For example, a timing value may be 20 ms, and a predetermined random delay may be 10 ms resulting in a total interval of 30 ms. This total interval value may then be used by packet traffic arbiter 406 to anticipate the random delay.

Figure 5:
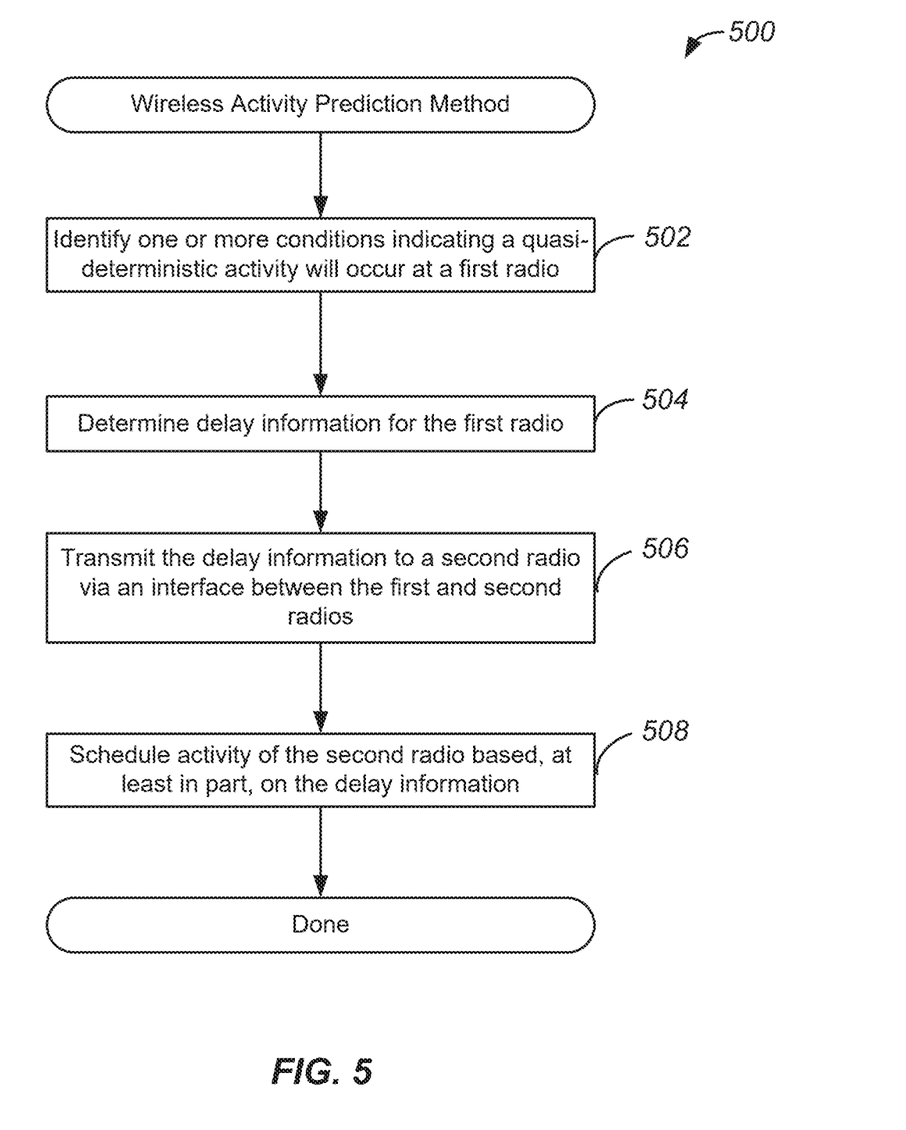
FIG. 5 illustrates a flow chart of an example of a method for wireless activity prediction, implemented in accordance with some embodiments.

FIG. 5 illustrates a flow chart of an example of a method for wireless activity prediction, implemented in accordance with some embodiments. Accordingly, a method, such as method 500, may be implemented to share timing information between collocated radios of a wireless device. Such timing information may be used to facilitate prediction of future activity of such collocated radios. As will be discussed in greater detail below, prediction of such activity allows collocated radios to schedule wireless activity to avoid resource conflicts.

Method 500 may perform operation 502 during which one or more conditions may be identified. In various embodiments, the one or more conditions may indicate quasi-deterministic activity will occur at a first radio. For example, such quasi-deterministic activity may be transmission activity or medium usage that will be performed by the first radio where such activity is not entirely periodic, and is, at least in part, randomized. As will be discussed in greater detail below, such activity may be partially randomized in accordance with one or more wireless communications protocols. In various embodiments, the one or more conditions may be one or more identifiers identifying a radio frequency (RF) active request associated with an advertisement interval. Accordingly, during operation 502, one or more components of the first radio may determine that a RF active request will be transmitted.

Method 500 may perform operation 504 during which delay information may be determined for the first radio. In various information, the delay information may be determined based on one or more aspects of a wireless communications protocol. For example, as will be discussed in greater detail below, a wireless communications protocol such as Bluetooth may introduce a random delay at advertisement anchor points. Accordingly, a timing of a subsequently transmitted RF active request may be modulated based on such a random delay. In various embodiments, during operation 504, one or more components of the first radio may determine the random delay that is to be applied to the next transmission that is to be sent from the first radio.

Method 500 may perform operation 506 during which the delay information may be transmitted to a second radio via an interface between the first and second radios. Accordingly, the determined delay may be transmitted to one or more components of the second radio such that the second radio is provided with such delay information. As will be discussed in greater detail below, the delay information may be sent via an interface between the first and second radios.

Method 500 may perform operation 508 during which activity of the second radio may be scheduled based, at least in part, on the delay information. Accordingly, one or more components of the second radio may schedule subsequent activity of the second radio based on the received delay information such that the activity of the second radio does not conflict with the first radio. As will be discussed in greater detail below, because the second radio has been provided with the delay information, it is able to precisely predict when the next activity of the first radio will be, and is able to avoid scheduling activity of the second radio that would otherwise conflict with the next activity of the first radio.

Figure 6:
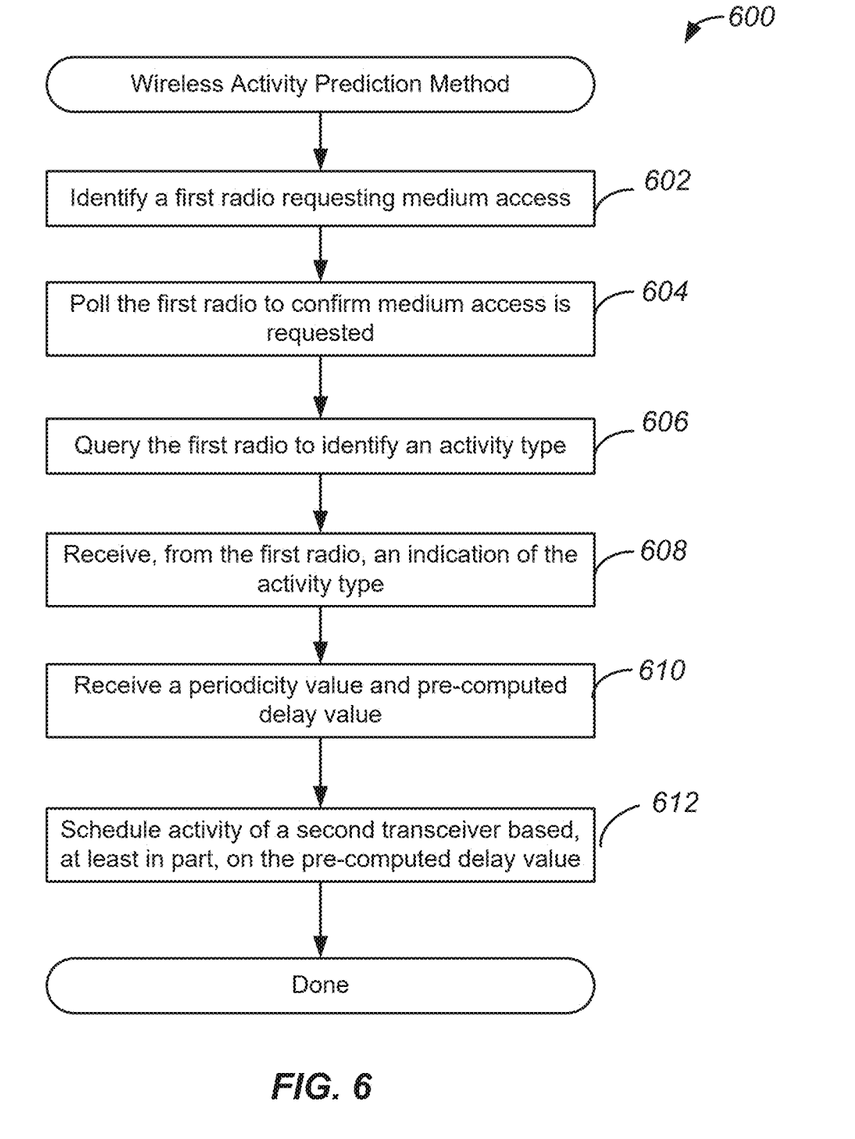
FIG. 6 illustrates a flow chart of another example of a method for wireless activity prediction, implemented in accordance with some embodiments.

FIG. 6 illustrates a flow chart of another example of a method for wireless activity prediction, implemented in accordance with some embodiments. Accordingly, a method, such as method 600, may be implemented to share timing information that may be used to facilitate prediction of future activity of collocated radios. As will be discussed in greater detail below, such determination and sharing of timing information may be implemented based on a type of activity associated with the collocated radios, and may be at least partially managed by one of the collocated radios.

Method 600 may perform operation 602 during which a first radio may be identified. In various embodiments, the first radio is a radio that is requesting medium access. Accordingly, during operation 602, a second radio may receive a request from the first radio, and may identify both the first radio as well as the presence of a request from the first radio to access a transmission medium. In various embodiments, the first radio may be a Bluetooth radio, and the second radio may be a Wi-Fi radio. Accordingly, the request may be an RF active request sent from the Bluetooth radio.

Method 600 may perform operation 604 during which the first radio may be polled by a second radio. In various embodiments, the polling operation is implemented to confirm that the first radio is requesting medium access. Accordingly, during operation 604, the second radio may send a message to the first radio to prompt the first radio to provide confirmation of the received request, and confirmation of the request may be received from the first radio.

Method 600 may perform operation 606 during which the first radio may be queried to identify a type of activity that is associated with the request. Accordingly, the second radio may poll the first radio to prompt the first radio to provide additional information regarding the activity associated with the received request. More specifically, the second radio may poll the first radio to determine if the activity is periodic, or is, at least in part, randomized.

Method 600 may perform operation 608 during which an indication of the activity type is received. Accordingly, during operation 608, a reply may be received from the first radio, and the reply may include one or more identifiers indicating what type of activity is being requested. For example, the reply may indicate that the requested activity is an advertisement transmission being transmitted by the first radio that may be a Bluetooth radio. Thus, the second radio may receive the indication of the activity type, and may determine whether the activity type is periodic or quasi-deterministic. As will be discussed in greater detail below, the second radio may also determine one or more scheduling parameters based on the identified activity type. For example, the identifiers representing an activity type may be mapped to scheduling technique based on a predetermined mapping stored in memory. In another example, the identifiers may include an indicator, such as a flag, which is set to indicate whether or not activity is periodic or quasi-deterministic, and accordingly, if pre-computed delays should be used for scheduling, as discussed in greater detail below.

Method 600 may perform operation 610 during which a periodicity value and pre-computed delay value are received. Accordingly, the first radio may transmit the periodicity value and pre-computed delay value to the second radio via an interface. As similarly discussed above, the periodicity value and pre-computed delay value may be determined in accordance with one or more parameters of a wireless communications protocol. In one example, the periodicity value may be a duration of an advertisement interval used by the first radio. Moreover, the pre-computed delay value may be a randomized delay value that has been computed in accordance with the Bluetooth protocol.

Method 600 may perform operation 612 during which activity of the second radio may be scheduled based, at least in part, on the pre-computed delay value. Accordingly, one or more components of the second radio may utilize the identified activity type, the periodicity value, and pre-computed delay value to schedule activity of the second radio such that it does not conflict with the requested activity of the first radio. In various embodiments, the second radio is a Wi-Fi radio, and a packet traffic arbiter of the second radio may be configured to implement such scheduling. Accordingly, the second radio may determine that the requested activity is quasi-deterministic and is not purely periodic. Furthermore, the second radio may determine that activity should be scheduled around activity that is at least partially randomized.

In various embodiments, the second radio may utilize the periodicity value and the pre-computed delay value to compute an active time at which the requested activity will occur. The second radio may then schedule activity of the second radio to avoid that computed active time. More specifically, the second radio may schedule one or more parking operations during the computed active time such that activity of the second radio is ceased during that time. In this way, the second radio may precisely identify and predict a time of the requested activity despite the requested activity being randomized, and may avoid conflicting activity during that time.

While embodiments disclosed herein describe scheduling techniques performed based on a type of wireless activity, it will be appreciated that a scheduling technique may be applied regardless of activity type. For example, precomputed delay values may be utilized regardless of activity type, and a precomputed delay value may be zero for periodic activity. Accordingly, deterministic wireless tasks may be interweaved with asynchronous/aperiodic tasks. Moreover, periodic tasks may already be scheduled, and a scheduler may scheduler other periodic/aperiodic tasks in addition to the existing periodic tasks.

Figure 7:
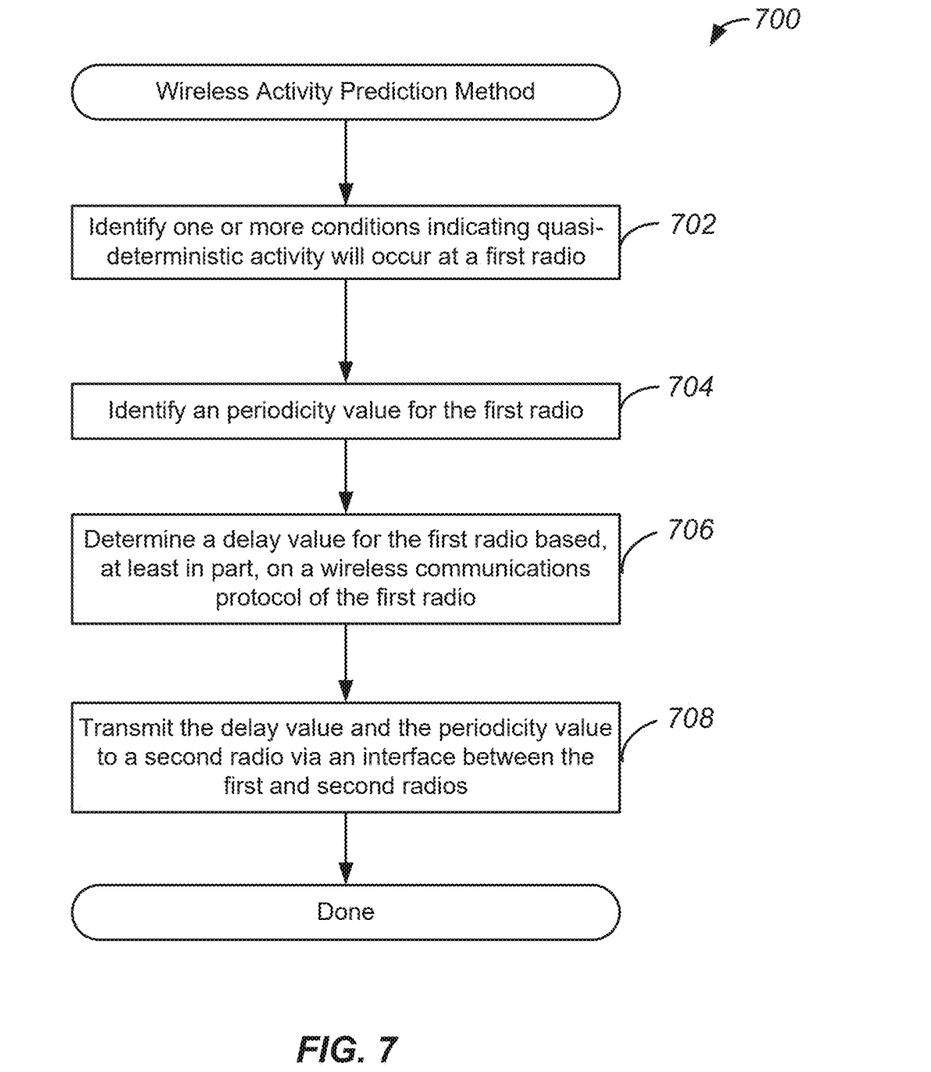
FIG. 7 illustrates a flow chart of yet another example of a method for wireless activity prediction, implemented in accordance with some embodiments.

FIG. 7 illustrates a flow chart of yet another example of a method for wireless activity prediction, implemented in accordance with some embodiments. Accordingly, a method, such as method 700, may be implemented to generate and share timing information that may be used to facilitate prediction of future activity of collocated radios. As will be discussed in greater detail below, such determination and sharing of timing information may be generated based on one or more aspects of a wireless communications protocol of a collocated radio.

Method 700 may perform operation 702 during which one or more conditions may be identified. As similarly discussed above, the one or more conditions may indicate quasi-deterministic activity will occur at a first radio. For example, such quasi-deterministic activity may be transmission activity or medium usage that will be performed by the first radio where such activity is not entirely periodic, and is, at least in part, randomized. In various embodiments, the one or more conditions may be one or more identifiers identifying a radio frequency (RF) active request associated with an advertisement interval. Accordingly, during operation 702, one or more components of the first radio may determine that an RF active request will be transmitted for advertisement activity. Such a determination may be made based on a passage of a duration of time, or a request received from another system component coupled to the first radio.

Method 700 may perform operation 704 during which a periodicity value may be determined by the first radio based, at least in part, on a wireless communications protocol of the first radio. As similarly discussed above, the RF active request may be associated with advertisement activity that is implemented at least partially periodically. Accordingly, the advertisement activity may be implemented, at least in part, using an advertisement interval that defines a duration of time or a period at which advertisement activity is performed. Accordingly, during operation 704, one or more components of the first radio, such as a scheduler, may determine an advertisement period. In various embodiments, such an advertisement period may be defined by one or more parameters of a wireless communications protocol. Accordingly, the advertisement period may be determined based, at least in part, on a Bluetooth protocol.

Method 700 may perform operation 706 during which a delay value may be determined by the first radio based, at least in part, on the wireless communications protocol of the first radio. As similarly discussed above, the delay value may be a randomized delay introduced in accordance with one or more parameters of a wireless communications protocol, such as a Bluetooth protocol. Accordingly, during operation 706, one or more components of the first radio, such as the scheduler, may determine a randomized delay that is to be added to the advertisement period discussed above.

Method 700 may perform operation 708 during which the delay value and the periodicity value may be transmitted to a second radio via an interface. Accordingly, the first radio may include both the periodicity value and the delay value in a message, and may send the message to the second radio. As similarly discussed above, the second radio, which may be a Wi-Fi radio, may utilize the delay value and the periodicity value to schedule activity and parking operations of the second radio such that they don't conflict with the advertisement activity associated with the RF active request.

Figure 8:
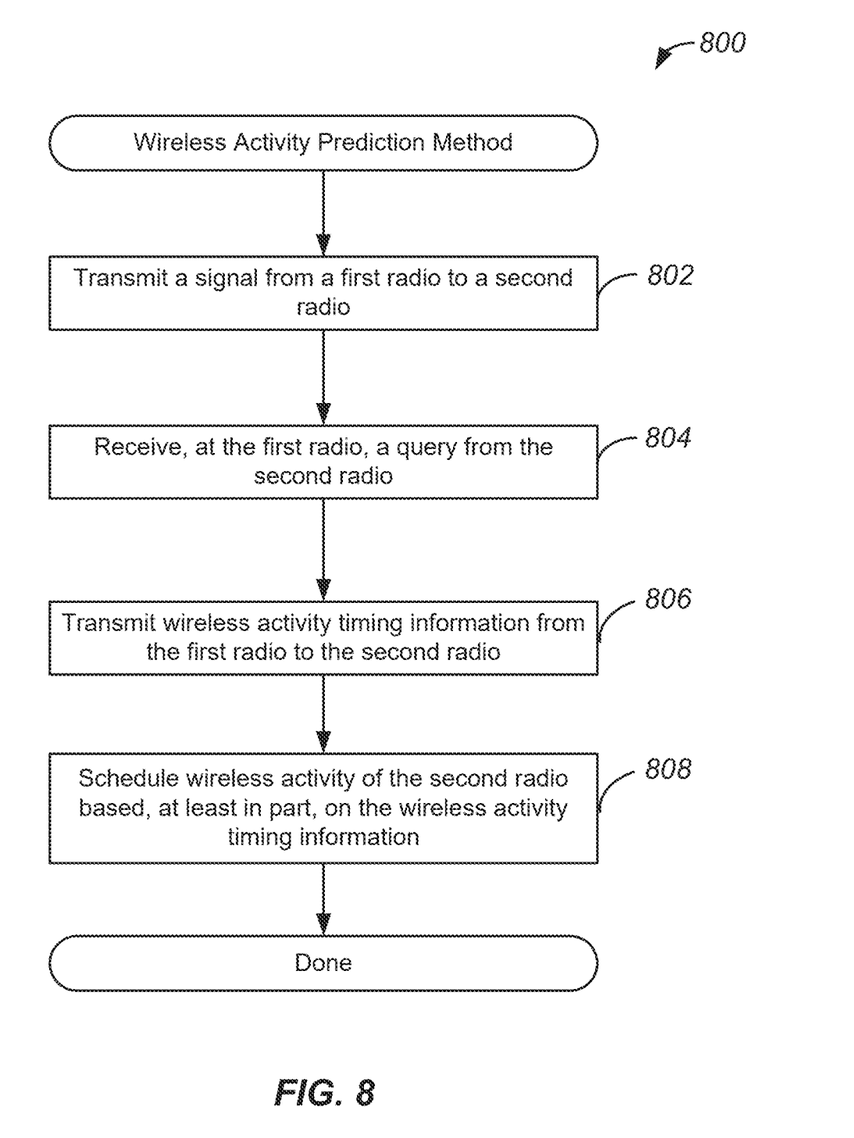
FIG. 8 illustrates a flow chart of an additional example of a method for wireless activity prediction, implemented in accordance with some embodiments.

FIG. 8 illustrates a flow chart of an additional example of a method for wireless activity prediction, implemented in accordance with some embodiments. Accordingly, a method, such as method 800, may be implemented to share timing information that may be used to facilitate prediction of future activity of collocated radios. As will be discussed in greater detail below, dedicated signals may be used to trigger such sharing of information to enable a requesting radio to trigger information sharing for a particular upcoming wireless activity.

Method 800 may perform operation 802 during which a signal may be transmitted from a first radio to a second radio. In various embodiments, the signal may be configured to cause the second radio to implement one or more polling and scheduling operations, such as those discussed above with reference to FIG. 6. More specifically, the signal may be a dummy RF active request, or may be another type of signal such as a dedicated interrupt signal. In this way, the first radio may be configured to generate a particular signal to trigger the intake of wireless activity timing information by the second radio.

Method 800 may perform operation 804 during which a query may be received at the first radio from the second radio. Accordingly, in response to receiving the signal, the second radio may perform one or more polling operations to obtain wireless activity timing information from the first radio. More specifically, as similarly discussed above with reference to FIG. 6, the second radio may query the first radio to obtain additional information, such as a particular activity type. In some embodiments, the polling operations may be implemented in response to de-assertion of a signal. For example, polling may be implemented in response to a RF active signal being de-asserted.

Method 800 may perform operation 806 during which the first radio may transmit wireless activity timing information to the second radio. Accordingly, the first radio may identify an upcoming wireless activity, and may determine one or more values, such as a periodicity value and a pre-computed delay value, for such upcoming activity. In various embodiments, the wireless activity timing information may also include additional information, such as priority information, or other temporal information, such as a timing of the wireless activity that is not necessarily tied to a particular wireless protocol. For example, the timing may be represented as a temporal offset or a time to execution, and not tied to an advertisement interval.

In various embodiments, the activity represented in the wireless activity timing information may include first invocations of new activities, one-shot activities, absence of a periodic activity that has just stopped, and/or activities that have stopped due to resource conflicts. In this way, the wireless activity timing information may include a comprehensive representation of different types and changes to upcoming wireless activity.

Method 800 may perform operation 808 during which the second radio may schedule wireless activity based, at least in part, on the wireless activity timing information. As similarly discussed above, one or more components of the second radio may utilize the wireless activity timing information to schedule activity of the second radio such that it does not conflict with the requested activity of the first radio. For example, the second radio may use an identified activity type, the periodicity value, and pre-computed delay value to perform such scheduling. As discussed above, the second radio may determine that the requested activity is quasi-deterministic and is not purely periodic, and may ensure that activity is scheduled around such activity despite it being at least partially randomized or unanticipated, as may be the case with new invocations of activities.

Figure 9:
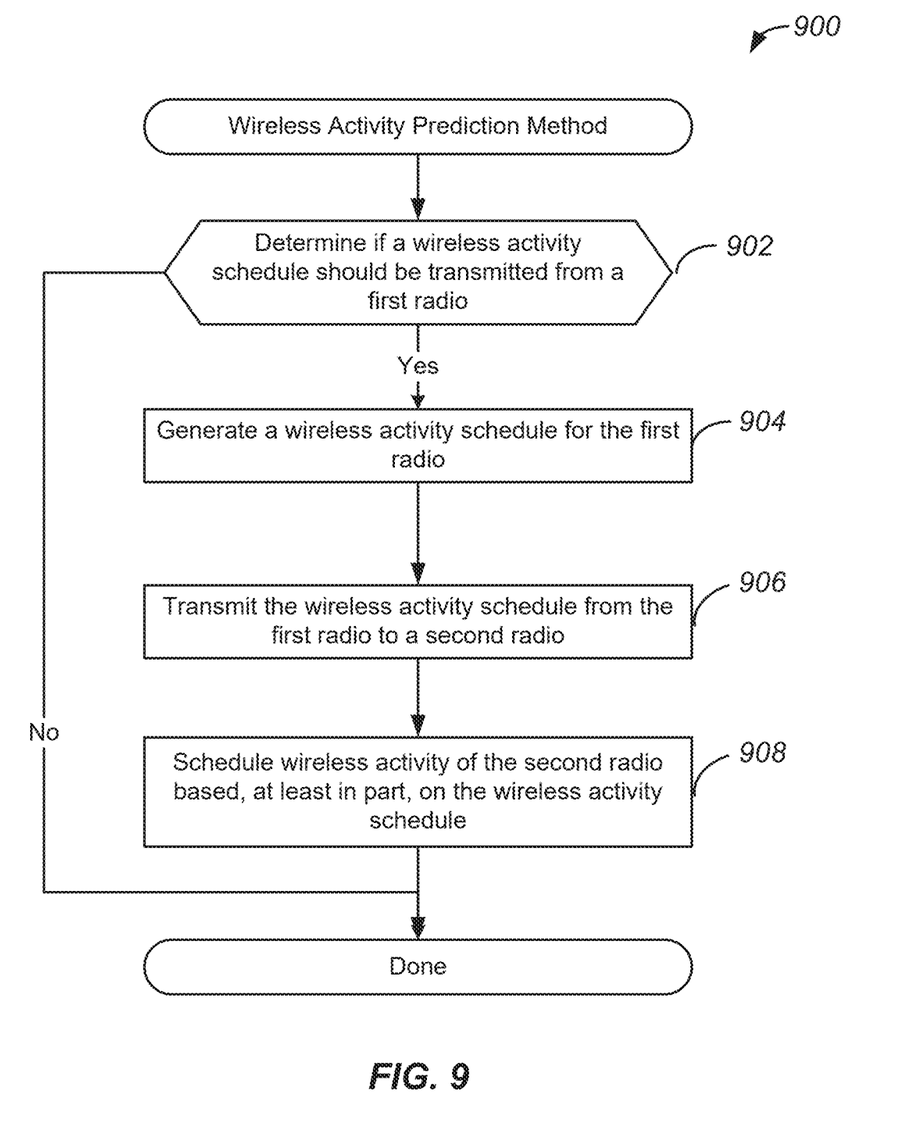
FIG. 9 illustrates a flow chart of another example of a method for wireless activity prediction, implemented in accordance with some embodiments.

FIG. 9 illustrates a flow chart of another example of a method for wireless activity prediction, implemented in accordance with some embodiments. Accordingly, a method, such as method 900, may be implemented to share timing information that may be used to facilitate prediction of future activity of collocated radios. As will be discussed in greater detail below, detailed scheduling information may be shared between collocated radios, and such detailed scheduling information may enable sharing of such timing information over configurable windows of time.

Method 900 may perform operation 902 during which it may be determined if a wireless activity schedule should be transmitted. In various embodiments, a wireless activity schedule may provide detailed scheduling information of wireless activity over a window of time that may be configurable by, for example, a user or manufacturer during a configuration process. Accordingly, the wireless activity schedule may include a map of all wireless activities of the first radio during the designated window of time, and the wireless activity schedule may include information such as types of activities, priorities of activities, as well as start times and end times of each activity. Thus, the wireless activity schedule provides a comprehensive view, within the window, of activities that may be periodic or aperiodic.

In some embodiments, such a determination may be made based on one or more designated parameters, such as a passage of a period of time. Accordingly, transmission of a wireless activity schedule may be performed periodically and according to a designated time period not coupled to a wireless communications protocol, such as an advertisement period. Accordingly, the designated time period may be represented as a unit of time or a temporal offset. In various embodiments, the determination may be made in response to the occurrence of an event. For example, the determination may be made responsive to detecting a particular wireless activity at the first radio. In another example, the determination may be made responsive to detecting a change in a wireless activity schedule, such as a cessation of a periodic activity or an invocation of a new activity. Accordingly, if it is determined that no wireless activity schedule should be transmitted, method 900 may terminate. If it is determined that a wireless activity schedule should be transmitted, method 900 may proceed to operation 904.

Accordingly, during operation 904 during, the first radio may generate a wireless activity schedule. Thus, the first radio may poll components included in the first radio to obtain scheduling information of the first radio, and the first radio may then generate a data object that includes a representation of all wireless activity of the first radio within the designated time window. As discussed above, the data object may include identifiers associated with each activity, start times and end times of each activity, as well as priorities of such activities.

Method 900 may perform operation 906 during which the first radio may transmit the wireless activity schedule to a second radio via an interface. In this way, the wireless activity schedule may be shared with the second radio, and the second radio may be provided with a comprehensive representation of the activity of the first radio over the designated time window.

Method 900 may perform operation 908 during which the second radio may schedule wireless activity based, at least in part, on the wireless activity schedule. As similarly discussed above, one or more components of the second radio may utilize the wireless activity schedule to schedule activity of the second radio such that it does not conflict with the activity of the first radio identified within the wireless activity schedule. For example, the second radio may use the identified start and end times to schedule parking operations for the second radio during which the second radio is inactive. In this way, the second radio may generate a complimentary wireless activity schedule to avoid resource conflicts.

Figure 10:
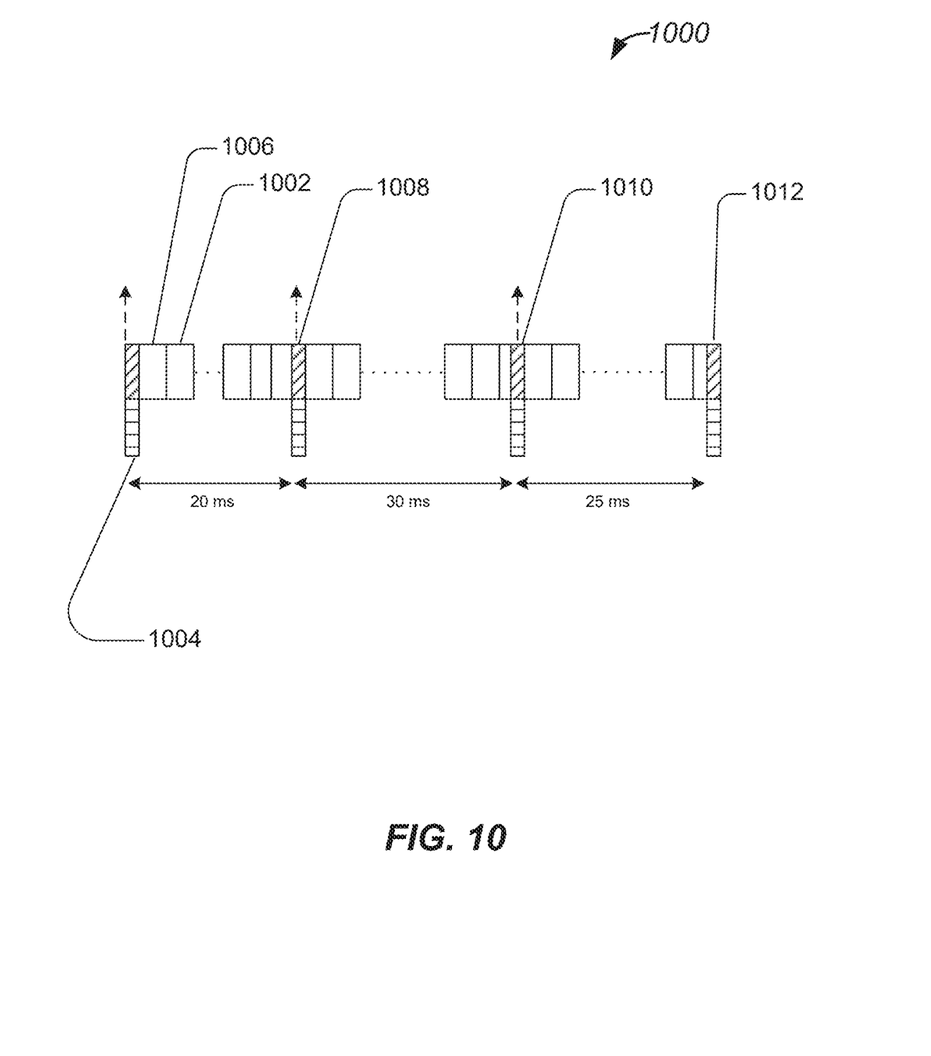
FIG. 10 illustrates a timing diagram of wireless activity prediction, implemented in accordance with some embodiments.

FIG. 10 illustrates a timing diagram of wireless activity prediction, implemented in accordance with some embodiments. As shown in diagram 1000, Wi-Fi activity, as shown by Wi-Fi activity intervals, such as interval 1002, may be implemented by a Wi-Fi radio. Similarly, Bluetooth activity, as shown by Bluetooth activity intervals, such as interval 1004, may be implemented by a Bluetooth radio. Such Bluetooth activity may be transmission of an RF active request or other advertisement activity. Moreover, protection frames, such as protection frames 1006, 1008, 1010, and 1012, may be used to protect the Wi-Fi radio from interference from the Bluetooth activity. In various embodiments, such protection frames may be CTS-2-self frames.

Diagram 1000 further illustrates how advertisement intervals between Bluetooth activity may vary in duration. For example, one advertisement interval may be 20 ms, while another interval may be 30 ms or may be 25 ms. Accordingly, the advertisement interval may be 20 ms and incorporate a random delay that ranges from 0 ms-10 ms. Thus, as shown in diagram 1000, the timing of the Bluetooth activity is at least partially randomized. As also shown in diagram 1000, the timing of the cessation in Wi-Fi activity and the use of protection frames is precisely timed to coincide with the Bluetooth activity. Such timing is enabled via the sharing of timing of information discussed above that enables the Wi-Fi radio to predict when the Bluetooth activity will be, and schedule Wi-Fi activity accordingly.

Figure 11:
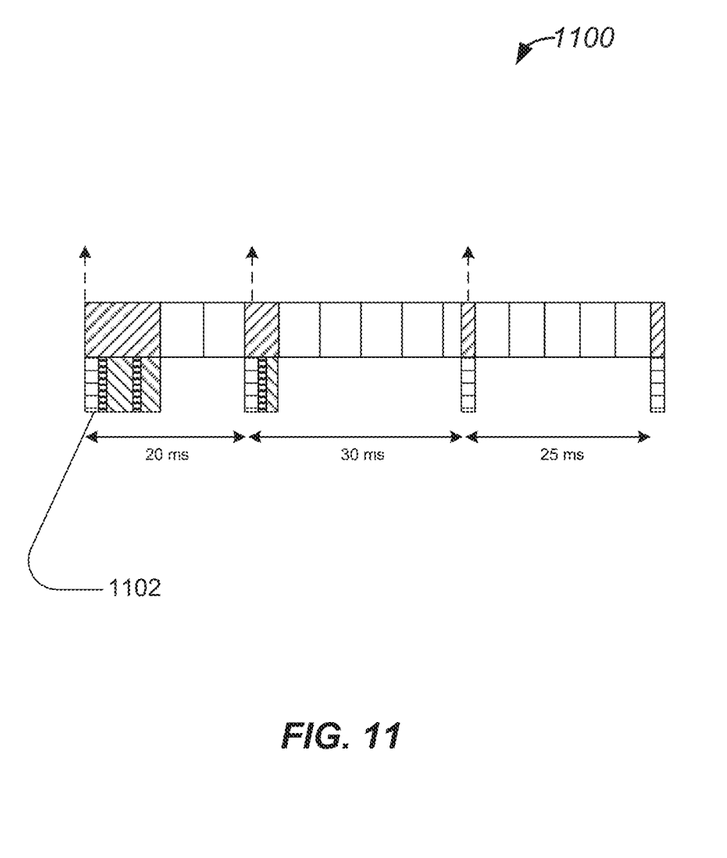
FIG. 11 illustrates another timing diagram of wireless activity prediction, implemented in accordance with some embodiments.

FIG. 11 illustrates another timing diagram of wireless activity prediction, implemented in accordance with some embodiments. As shown in diagram 1100, one or more constraints may be placed on a Bluetooth scheduler. For example, a minimum auxiliary frame space (T_MAFS) parameter may be set to a designated value. In one example, setting a T_MAFS value to 300 microseconds may enable grouping of extended advertisement activity close to a primary advertisement event, such as anchor point 1102. When constrained in this manner, a wider window may be provided for the Wi-Fi radio to implement frame aggregation.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
  identifying one or more conditions indicating aperiodic activity will occur at a first radio, the first radio being a wireless radio compatible with a first wireless communications protocol;
  receiving, at a second radio collocated with the first radio within a wireless device, timing information associated with the first radio via an interface between the first radio and the second radio, the second radio being a wireless radio compatible with a second wireless communications protocol; and
  scheduling wireless activity of the second radio based, at least in part, on upcoming transmission events of the first radio defined by transmission event information and pre-computed advertisement interval information included in the timing information received via the interface, the pre-computed advertisement information representing upcoming quasi-deterministic advertisement intervals having estimated timings determined based on a periodicity value and a delay value determined based, at least in part, on a specification of the first wireless communications protocol, the scheduling comprising using the transmission event information and pre-computed advertisement interval information to schedule and generate protection frames that reduce interference at the second radio during the upcoming transmission events and advertisement intervals of the first radio.

2. The method of claim 1, wherein the timing information comprises one or more data values representing a duration of an advertisement interval and a delay value.

3. The method of claim 2, wherein the timing information is included in a radio frequency (RF) active request sent from the first radio.

4. The method of claim 1, wherein the first wireless communications protocol is a Bluetooth protocol, and wherein the first radio is a Bluetooth radio.

5. The method of claim 4, wherein the second wireless communications protocol is a Wi-Fi protocol, and wherein the second radio is a Wi-Fi radio.

6. The method of claim 1, wherein the timing information is received at a packet traffic arbiter associated with the second radio.

7. The method of claim 6, wherein the timing information is sent from a scheduler associated with the first radio.

8. The method of claim 1, wherein the identifying is responsive to a signal sent from the first radio.

9. The method of claim 1, wherein the timing information is a mapping of wireless activity over a designated period of time.

10. A system comprising:
  a first communications subsystem comprising a first transceiver and first processing elements, wherein the first communications subsystem is compatible with a first wireless communications protocol, and wherein the first communications subsystem is configured to transmit timing information representing aperiodic activity of a first radio;
  a second communications subsystem comprising a second transceiver and second processing elements, wherein the second communications subsystem is compatible with a second wireless communications protocol, wherein the first communications subsystem is collocated with the second communications subsystem in a wireless device, and wherein the second communications subsystem is configured to:
    receive the timing information associated with the first radio;
    schedule wireless activity of the second radio based, at least in part, on upcoming transmission events of the first radio defined by pre-computed transmission event information and pre-computed advertisement interval information included in the timing information, the pre-computed advertisement information representing upcoming quasi-deterministic advertisement intervals having estimated timings determined based on a periodicity value and a delay value determined based, at least in part, on a specification of the first wireless communications protocol, the scheduling comprising using the transmission event information and pre-computed advertisement interval information to schedule and generate protection frames that reduce interference at the second radio during the upcoming transmission events and advertisement intervals of the first radio; and
  an interface coupled between the first communications subsystem and the second communications subsystem, and configured to transmit the timing information from the first communications subsystem to the second communications subsystem.

11. The system of claim 10, wherein the timing information comprises one or more data values representing a duration of an advertisement interval and a delay value, and wherein the timing information is included in a radio frequency (RF) active request sent from the first radio.

12. The system of claim 10, wherein the first wireless communications protocol is a Bluetooth protocol, wherein the first radio is a Bluetooth radio, wherein the second wireless communications protocol is a Wi-Fi protocol, and wherein the second radio is a Wi-Fi radio.

13. The system of claim 10, wherein the timing information is received at a packet traffic arbiter associated with the second radio, and wherein the timing information is sent from a scheduler associated with the first radio.

14. The system of claim 10, wherein the first radio is configured to send a dedicated interrupt signal to the second radio via the interface.

15. The system of claim 10, wherein the timing information is a mapping of wireless activity over a designated period of time.

16. A device comprising:
   first processing elements compatible with a first wireless communications protocol, wherein the first processing elements are configured to transmit timing information representing aperiodic activity of a first radio;
   second processing elements compatible with a second wireless communications protocol, wherein the first and second processing elements are collocated in a wireless device, and wherein the second processing elements are configured to:
      receive the timing information from the first processing elements;
      schedule wireless activity of a second radio based, at least in part, on upcoming transmission events of the first radio defined by pre-computed transmission event information and pre-computed advertisement interval information included in the timing information, the pre-computed advertisement information representing upcoming quasi-deterministic advertisement intervals having estimated timings determined based on a periodicity value and a delay value determined based, at least in part, on a specification of the first wireless communications protocol, the scheduling comprising using the transmission event information and pre-computed advertisement interval information to schedule and generate protection frames that reduce interference at the second radio during the upcoming transmission events and advertisement intervals of the first radio; and
   an interface coupled between the first and second processing elements, and configured to transmit the timing information from the first processing elements to the second processing elements.

17. The device of claim 16, wherein the timing information comprises one or more data values representing a duration of an advertisement interval and a delay value, and wherein the timing information is included in a radio frequency (RF) active request sent from the first radio.

18. The device of claim 16, wherein the first wireless communications protocol is a Bluetooth protocol, wherein the first processing elements are associated with a Bluetooth radio, wherein the second wireless communications protocol is a Wi-Fi protocol, and wherein the second processing elements are associated with a Wi-Fi radio.

19. The device of claim 16, wherein the first processing elements comprise a scheduler, and wherein the second processing elements comprise a packet traffic arbiter.

20. The device of claim 19, wherein the timing information is received at the packet traffic arbiter, and wherein the timing information is sent from the scheduler.

\* \* \* \* \*